US011689371B2

(12) United States Patent
Yadlin et al.

(10) Patent No.: US 11,689,371 B2
(45) Date of Patent: Jun. 27, 2023

(54) TECHNIQUES FOR SECURING DIGITAL SIGNATURES USING MULTI-PARTY COMPUTATION

(71) Applicant: PAYPAL, INC., San Jose, CA (US)

(72) Inventors: Dan Yadlin, Tel-Aviv (IL); Ben Riva, Givatayim (IL); Alon Navon, Tel-Aviv (IL); Lev Pachmanov, Haifa (IL); Jonathan Katz, Silver Spring, MD (US)

(73) Assignee: PAYPAL, INC., San Jose, CA (US)

( * ) Notice: Subject to any disclaimer, the term of this patent is extended or adjusted under 35 U.S.C. 154(b) by 216 days.

(21) Appl. No.: 16/524,692

(22) Filed: Jul. 29, 2019

(65) Prior Publication Data

US 2020/0044863 A1 Feb. 6, 2020

Related U.S. Application Data

(60) Provisional application No. 62/713,834, filed on Aug. 2, 2018.

(51) Int. Cl.
*H04L 29/06* (2006.01)
*H04L 9/32* (2006.01)
(Continued)

(52) U.S. Cl.
CPC .............. *H04L 9/3247* (2013.01); *G06F 9/54* (2013.01); *H04L 9/085* (2013.01); *H04L 9/30* (2013.01);
(Continued)

(58) Field of Classification Search
CPC ......... H04L 9/3247; H04L 9/30; H04L 9/085; H04L 2209/56; H04L 2209/46;
(Continued)

(56) References Cited

U.S. PATENT DOCUMENTS 9,411,982 B1 * 8/2016 Dippenaar .............. H04L 9/085
10,084,596 B1 * 9/2018 Triandopoulos ........ H04L 9/085
(Continued)

FOREIGN PATENT DOCUMENTS

WO 2017145010 A1 8/2017

OTHER PUBLICATIONS

Damgard et al., "A Generalization of Paillier's Public-Key System with Applications to Electronic Voting", International Journal of Information Security, Sep. 30, 2010, pp. 371-372.
(Continued)

*Primary Examiner* — Taghi T Arani
*Assistant Examiner* — Lin Chang
(74) *Attorney, Agent, or Firm* — Haynes and Boone, LLP

(57) ABSTRACT

Techniques for securing digital signatures using multi-party computation. A method includes generating at least one first secret share by a first system, wherein at least one second secret share is generated by one of at least one second system; signing data based on the at least one first secret share when a signing policy is met, wherein the signing is part of an interactive signing process including running a multi-party computation protocol by the first system and the at least one second system, wherein the signed data corresponds to a public key generated based on the plurality of secret shares, wherein the signing policy requires a minimum number of secret shares, wherein shares of one system alone are not sufficient to meet the signing policy, wherein no portion of shares of one system are revealed to the other system during the interactive signing process.

27 Claims, 4 Drawing Sheets

(51) Int. Cl.
*H04L 9/08* (2006.01)
*G06F 9/54* (2006.01)
*H04L 9/30* (2006.01)
*H04L 9/00* (2022.01)

(52) U.S. Cl.
CPC ............ *H04L 9/50* (2022.05); *H04L 2209/46* (2013.01); *H04L 2209/56* (2013.01)

(58) Field of Classification Search
CPC ..... H04L 2209/38; H04L 9/3255; G06F 9/54; G06F 21/44
See application file for complete search history.

(56) References Cited

U.S. PATENT DOCUMENTS

| | | | |
|---|---|---|---|
| 2004/0103276 A1* | 5/2004 | Jing | H04L 9/0827 713/156 |
| 2006/0190734 A1* | 8/2006 | Spitz | H04L 9/3247 713/176 |
| 2009/0217034 A1* | 8/2009 | Sudia | G06Q 20/3829 713/156 |
| 2015/0262139 A1 | 9/2015 | Shtylman | |
| 2015/0262171 A1 | 9/2015 | Langschaedel et al. | |
| 2016/0294550 A1* | 10/2016 | French | H04L 9/3066 |
| 2017/0104588 A1* | 4/2017 | Camenisch | H04L 9/0869 |
| 2017/0149572 A1 | 5/2017 | Wallrabenstein | |
| 2017/0277831 A1* | 9/2017 | Ruff | A61B 6/485 |
| 2018/0212763 A1 | 7/2018 | Camenisch et al. | |
| 2018/0241565 A1* | 8/2018 | Paolini-Subramanya | H04L 9/0637 |
| 2018/0357427 A1 | 12/2018 | Lindell et al. | |
| 2018/0359097 A1* | 12/2018 | Lindell | H04L 9/008 |
| 2018/0365396 A1* | 12/2018 | Rucker | G06F 21/645 |
| 2018/0367298 A1* | 12/2018 | Wright | H04L 9/0825 |
| 2018/0367316 A1* | 12/2018 | Cheng | H04L 9/3247 |
| 2019/0222414 A1 | 7/2019 | Pe'er et al. | |
| 2019/0245857 A1 | 8/2019 | Pe'er et al. | |
| 2019/0280857 A1 | 9/2019 | Mishli et al. | |
| 2019/0347290 A1* | 11/2019 | Yang | G10H 1/0008 |
| 2020/0044861 A1* | 2/2020 | Buldas | H04L 9/30 |
| 2020/0074450 A1* | 3/2020 | Fletcher | H04L 9/3255 |
| 2020/0145231 A1* | 5/2020 | Trevethan | H04L 9/3239 |
| 2020/0213113 A1* | 7/2020 | Savanah | H04L 9/3073 |
| 2020/0374113 A1 | 11/2020 | Noam et al. | |
| 2021/0089676 A1* | 3/2021 | Ford | H04L 9/0825 |
| 2021/0152371 A1 | 5/2021 | Fletcher et al. | |

OTHER PUBLICATIONS

Damgard et al., "A Length-Flexible Threshold Cryptosystem with Applications", BRICS: Basic Research in Computer Science, Mar. 16, 2003, pp. 1-31.

Feldman, Paul., "A Practical Scheme for Non-interactive Verifiable Secret Sharing", FOCS: Foundations of Computer Science, 1987, pp. 427-438.

Gennaro et al., "Threshold-optimal DSA/ECDSA Signatures and an Application to Bitcoin Wallet Security", 2016, pp. 1-42.

Hazay et al., "Efficient RSA Key Generation and Threshold Paillier in the Two-Party Setting", In Cryptographers Track at the RSA Conference, 2012, pp. 313-331.

Poupard et al., "Short Proofs of Knowledge for Factoring", In International Workshop on Public Key Cryptography, 2000, pp. 147-166.

* cited by examiner

TECHNIQUES FOR SECURING DIGITAL SIGNATURES USING MULTI-PARTY COMPUTATION

CROSS-REFERENCE TO RELATED APPLICATIONS

This application claims the benefit of U.S. Provisional Application No. 62/713,834 filed on Aug. 2, 2018, the contents of which are hereby incorporated by reference.

TECHNICAL FIELD

The present disclosure relates generally to digital signatures, and more specifically to securing digital signatures.

BACKGROUND

Since the advent of Bitcoin, adoption of digital assets and, in particular, digital currencies secured by cryptography ("cryptocurrencies"), has grown exponentially in recent years. With this exponential growth in use of digital currencies, interest in the underlying technologies used to provide these currencies has also grown significantly. Specifically, Bitcoin is a cryptocurrency which utilizes blockchains to record transactions involving transfers of Bitcoin currency. By using blockchains, transactions may be recorded without relying on a centralized banking system, thereby ensuring that the records are not lost in the event of hacking a single system or insolvency of the owner of the banking system. Further, transactions may be conducted anonymously.

As a result of the increased interest in blockchain technology, various new possible uses for blockchain have been devised. These uses include, but are not limited to, recording exchanges of goods, securely recording medical and other non-business data, "smart" contracts including code to be executed when certain conditions are met and recorded on a blockchain, and many more. Each use requires a different protocol to meet its unique needs.

A blockchain is a continuously growing distributed electronic ledger including blocks of data. Copies of the blockchain are maintained by peer devices in a peer-to-peer network typically consisting of thousands of peers and utilized by potentially millions of users that participate in transactions. Because a copy of the entire blockchain is maintained by each peer, no single centralized system is needed to maintain the records.

Each block in the blockchain is linked to a previous block such that altering one block consequently also requires altering the entire portion of the blockchain recorded after the altered block. Each block in a blockchain maintains transaction data related to one or more transactions, a timestamp indicating a time at which the block was validated, a cryptographic hash of its own content, and a cryptographic hash of the content of the previous block in the blockchain. A transaction represents an event occurring with respect to the blockchain such as, but not limited to, transfer of Bitcoin, recording of a transfer of a good, addition of an entry in a medical record, and the like. The linking of blocks is accomplished due to the presence of a hash of each previous block's contents in the next block in the blockchain. If a block is modified in an unauthorized manner, the hash of that block's contents is changed, thereby breaking the link with the next block in the blockchain. This ensures that the ledger is immutable and safe from manipulation by malicious entities.

A digital signature is a set of algorithms and encryption protocols utilized to verify the authenticity of a message contents. Each entity's identity is determined by the public key of a private/public key-pair. Only the owner of the private key can sign a message.

Existing solutions for digitally signing data involve storing and safeguarding private keys used for validating the signed contents. To this end, various key storage solutions have been used. Such solutions include, but are not limited to, allowing users to store their own keys (e.g., via applications such as wallets or dedicated hardware) and online or offline services offering to store keys on behalf of users. Further, some solutions may utilize multiple keys to sign a transaction, either by splitting the key into various pieces and reassembling it when signing ("Shamir Secret Sharing"), or by adding additional required keys (as an example for blockchain, on the blockchain protocol layer) ("Multi-Sig").

Transaction data stored on blockchains may utilize digital signatures to sign transactions and prevent unauthorized modification. For example, in Bitcoin and other cryptocurrencies, a transaction represents a transfer from one entity to another. In the context of blockchains, it is assumed that the private keys are secured by their respective wallet owners, who are identified by their public keys (also called "wallet addresses"). Once a transaction has achieved consensus on a ledger, it is irreversible. Therefore, it is crucial for wallet owners to secure their private keys.

In cryptocurrency applications such as Bitcoin, wallets are utilized to allow users to access currency. In cryptocurrency, a wallet is an application that stores public and private keys and is configured to interact with blockchains in order to access data contained therein. Wallets may be kept in cold or hot formats. A hot wallet is connected to the network, while a cold wallet is not. Because cold wallets are not connected to the network, they are typically not subjected to remote cyber-attacks. However, cold wallets remain subject to insider threats and physical damage. Each user stores their cold wallet in a respective device accessible to the user. The signing process is performed offline, and the resulting signed transaction is then moved by the user online to be transmitted to the blockchain.

As a result, many users and service providers of blockchain services utilize multiple wallets holding different portions of their currency values protected by different associated keys. For example, a small amount of currency may be "kept" in a hot wallet to allow immediate access while the majority of the currency is "kept" in a cold wallet to prevent theft over the network.

A block diagram 100 illustrating an example of an existing solution is shown in FIG. 1. In the example block diagram 100, a customer front end 110-1 and a customer back end 110-2 of a software-as-a-service (SaaS) wallet system (a service provider offering wallet service to consumers) are used to perform an exchange with respect to a blockchain-related transaction such as transfer of a Bitcoin. A wallet manager 120 is configured to access cryptocurrency of a cold wallet 130. The access is dependent on the specific implementation of the cold wallet 120 and the currency used. To this end, an authentication 140 is performed to verify that the transferring user is authorized. The access and authentication occur over a corporate network (not shown). Once the user is authenticated, the wallet manager 120 is configured to access a blockchain 150 stored over an external network (not shown) to record the transaction by signing transaction data using private keys. The external network may be or may include, but is not limited to, the Internet.

During this process, the private key is exposed, thereby creating an opening for an attacker. Additionally, an insider having access to the corporate network may be able to exploit vulnerabilities in the corporate network to steal the private key or to generate transactions without stealing the key by using the system that is self-guarding it.

Although blockchain offers various advantages with respect to security and stability, the technology still faces challenges that may undermine these advantages. Entities that maintain large amounts of crypto assets may be prime targets for attackers. Specifically, server breaches, application vulnerabilities, cloud account takeovers, and protocol vulnerabilities, present opportunities for attackers. Successful attackers have thus far caused dozens of blockchain-related incidents resulting in over $20 billion being irreversibly lost.

The challenges described above are even more significant when the entity owning the private key is not the entity using the private key. For example, in businesses (as opposed to the consumer use-case), the business owns the private key and the underlying assets while the employees are the entities performing the transactions.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for securing digital signatures using multi-party computation. The method comprises: generating at least one first secret share of a plurality of secret shares by a first system, wherein the plurality of secret shares includes the at least one first secret share and at least one second secret share, wherein each of the at least one second secret share is generated by one of at least one second system, wherein the at least one second system is not the first system; signing data based on the at least one first secret share when a signing policy is met, wherein the signing occurs as part of an interactive signing process, wherein the interactive signing process includes running a multi-party computation protocol by the first system and the at least one second system, wherein the signed data corresponds to a public key, wherein the public key is generated based on the plurality of secret shares, wherein the signing policy at least requires a minimum number of secret shares of the plurality of secret shares, wherein neither the at least one first secret share alone nor the at least one second secret share alone is sufficient to meet the signing policy, wherein no portion of the at least one first secret share is revealed to the at least one second system during the interactive signing process, wherein no portion of the at least one second secret share is revealed to the first system during the interactive signing process.

Certain embodiments disclosed herein also include a non-transitory computer readable medium having stored thereon causing a processing circuitry to execute a process, the process comprising: generating at least one first secret share of a plurality of secret shares by a first system, wherein the plurality of secret shares includes the at least one first secret share and at least one second secret share, wherein each of the at least one second secret share is generated by one of at least one second system, wherein the at least one second system is not the first system; signing data based on the at least one first secret share when a signing policy is met, wherein the signing occurs as part of an interactive signing process, wherein the interactive signing process includes running a multi-party computation protocol by the first system and the at least one second system, wherein the signed data corresponds to a public key, wherein the public key is generated based on the plurality of secret shares, wherein the signing policy at least requires a minimum number of secret shares of the plurality of secret shares, wherein neither the at least one first secret share alone nor the at least one second secret share alone is sufficient to meet the signing policy, wherein no portion of the at least one first secret share is revealed to the at least one second system during the interactive signing process, wherein no portion of the at least one second secret share is revealed to the first system during the interactive signing process.

Certain embodiments disclosed herein also include a system for securing digital signatures using multi-party computation. The system comprises: a processing circuitry; and a memory, the memory containing instructions that, when executed by the processing circuitry, configure the system to: generate at least one first secret share of a plurality of secret shares, wherein the system is a first system, wherein the plurality of secret shares includes the at least one first secret share and at least one second secret share, wherein each of the at least one second secret share is generated by one of at least one second system, wherein the at least one second system is not the first system; signing data based on the at least one first secret share when a signing policy is met, wherein the signing occurs as part of an interactive signing process, wherein the interactive signing process includes running a multi-party computation protocol by the first system and the at least one second system, wherein the signed data corresponds to a public key, wherein the public key is generated based on the plurality of secret shares, wherein the signing policy at least requires a minimum number of secret shares of the plurality of secret shares, wherein neither the at least one first secret share alone nor the at least one second secret share alone is sufficient to meet the signing policy, wherein no portion of the at least one first secret share is revealed to the at least one second system during the interactive signing process, wherein no portion of the at least one second secret share is revealed to the first system during the interactive signing process.

BRIEF DESCRIPTION OF THE DRAWINGS

The subject matter disclosed herein and other objects, features, and advantages of the disclosed embodiments will be apparent from the following detailed description taken in conjunction with the accompanying drawings.

DETAILED DESCRIPTION

Figure 1:
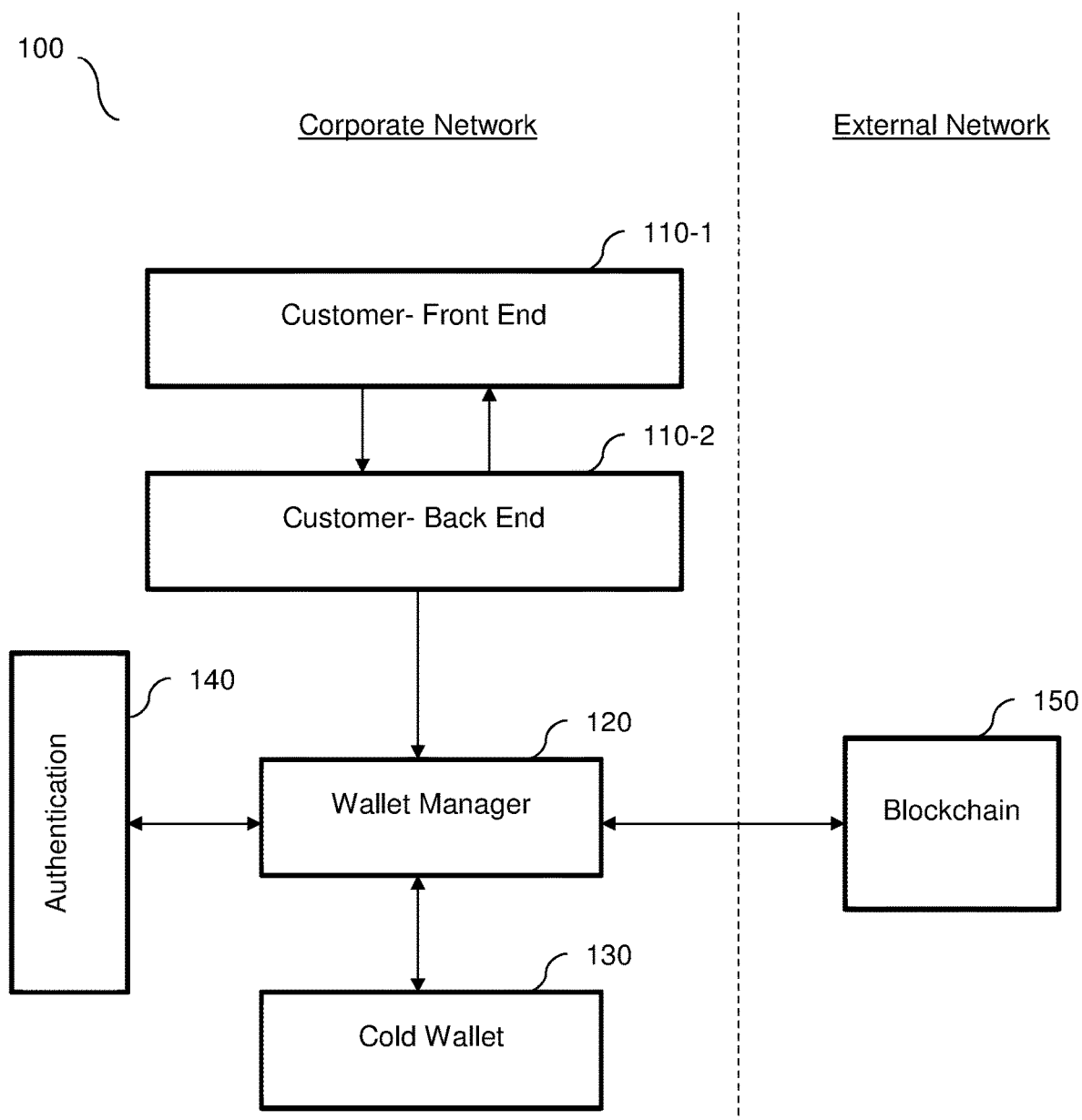
FIG. 1 is a block diagram illustrating an existing solution for securing blockchain transactions using a wallet manager service.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The security challenges related to digital signatures generally and blockchain applications specifically warrant new solutions for securing the digital signing process. To this end, it has been identified that securing private keys is a difficulty for every entity seeking to provide digital signature services. In particular, private keys present a single point of failure in that, if lost or stolen, may cause issues such as loss of access (e.g., to Bitcoin funds) or theft by malicious entities. Further, if systems responsible for signing are compromised, it is possible to steal the assets without getting access to the private keys simply by requesting that the signing module (such as a hardware signing module, or HSM) sign a transaction to the owner's wallet.

Additionally, although solutions utilizing multiple keys exist, it has been identified that such solutions increase the complexity of managing and securing the keys and, therefore, do not provide optimal performance. Further, existing multi-signature solutions used in crypto-currency are cryptocurrency-specific and are not able to be used for different cryptocurrencies. Moreover, existing multi-signature solutions that are based on smart contracts are prone to programming errors. and cost more in fees. Therefore, it has been identified that it would be advantageous to use a private key security and management layer that does not need to be part of the blockchain protocol layer and that can support all blockchain protocols, particularly when organizations may use more than one blockchain.

Also, it has been identified that minimizing the number of rounds of interaction during signing processes may be useful for security and regulatory reasons. Accordingly, the disclosed embodiments also include embodiments that support one or more of the parties to a signing being disconnected from a network used by the other parties.

To address the various challenges noted above, various disclosed embodiments include a secure digital asset management platform and techniques for securing digital signatures. In particular, the disclosed embodiments address the above-noted challenges in key usage by creating private keys used for digital signatures in a distributed way through two or more portions (hereinafter referred to as "shares" or "secret shares") and using the distributed shares by systems of two or more different entities, or parties. Each system is owned by a different entity. An interactive protocol (e.g., Multiparty Computation or Threshold Digital signature) is run between the systems. By the interactive protocol, each system generates and stores one or more shares such that the shares collectively enable the reconstruction of a corresponding private key but cannot be used for determining the private key while maintained separately. The private key never materializes in any of the protocols, and the shares do not need to be revealed outside of the respective systems that generated the shares.

For blockchain applications, signed messages representing transactions may be uploaded to the blockchain by one of the systems. To this end, one or more of the systems determines whether requests for the transactions meet a signing policy before signing of messages representing the transactions. A system that validated the transaction with respect to the signing policy engages in the signing protocol to sign the transactions only when the signing policy has been met. At least some of the shares are used to sign data such that systems lacking the necessary number of shares are unable to sign the data in accordance with the signing policy. The signing policy is a security policy that aligns the number of users approving the transaction to the risk the transaction poses. The protocol only works if a minimum number of shares of the split key to be used for signing the data are present.

In an example implementation, systems of two parties each independently generate a share and, through the key-generation protocol, a public key is revealed to them. Each system secures its corresponding share. The two parties can be a customer party and a cloud service provider party. A multi-party computation (MPC) service provider system validates whether the request is authentic and the signing policy for the data is met. When the request is validated, the MPC service provider system will engage in a multi-party computation signing protocol with its share. When the data includes transactions used for a blockchain, the MPC service provider system is configured to upload the resulting signed transactions to a blockchain. The signing policy requires at least a portion of the shares of the private key for signing of the data and may be configured by the customer system. The shares stored in each system may be rotated, for example every hour or day, such that shares are only valid for a limited period of time and the likelihood of collecting all shares before the next rotation is significantly reduced. The share rotation is also done through an interactive multiparty computation protocol.

MPC allows parties to jointly compute a function over their respective inputs while keeping those inputs private. Thus, utilizing MPC for the signing protocol allows for creating the shares secretly and independently by each participating party while ensuring that the shares collectively enable signing transactions without revealing the private key that corresponds to the collective secret shares.

In another example implementation, the service provider can have 3 shares each stored on a different cloud IaaS provider, while the customer can have 2 shares, one stored on employee devices and one stored on a backend. The number of shares can be higher than two and the number of required shares to sign can be lower than the number of shares.

In an embodiment, multiple sets of shares may be created by engaging a protocol to generate additional sets of shares corresponding to the same public key as the original set of shares. Each set of shares includes n shares (where n is an integer value greater than or equal to 2) and requires k out of n of its respective shares to be complete for signing purposes (where k is an integer value that with $1<k<=n$). Different sets of shares may be distributed differently, for example, each set may be assigned to a different employee or other user such that a user device of each employee stores a different share from that of other employees and a corresponding blockchain service provider system stores a different share for each employee. Further, if a share of a first set of shares is lost (e.g., a share assigned to a first employee is deleted or corrupted, etc.), new shares may be created using other existing shares. This allows for recovery of the shares without actually reconstructing or generating the private key. In a further embodiment, the shares held by the customer cannot be used to reconstruct the private key without the shares safeguarded by the MPC service provider system.

The disclosed embodiments may include various protocols utilized to facilitate the functions described herein. In an example implementation, securing the keys for digital signatures includes using a wallet key generation protocol that reveals the public key, a digital signature protocol, a share addition protocol, a backup creation protocol, and a new wallet key rotation protocol. The share addition protocol allows for creating new shares based on existing shares and may be utilized to add a new user or to rotate shares. The new wallet key rotation may be used to create a new wallet based on an existing wallet in a deterministic manner (for example, following the BIP32 standard).

In an embodiment, in the backup creation protocol, a master backup public key and a master backup private key may be created by one of the parties to allow for recovery of the shares in case a breach occurs, shares are lost such that the remaining shares are insufficient to recover the key, a service of the service provider becomes unavailable, and the like. This allows for unilateral recovery of the shares generated by a system. In an example implementation, a first system can create a master backup private/public pair and share the master backup public key with the other systems holding shares. The master backup private key may be stored in a secure location accessible by a customer associated with the system.

Each system storing one of the shares may receive a copy of the master backup public key, which may in turn be stored in a secure location (e.g., off network in a secure physical storage device). The master backup public key may be used to encrypt shares by an encrypting system of the systems, and the other system may validate the encryption of the encrypting system's shares by the encrypting system using the master backup public key. Specifically, the other system is configured to utilize a zero-knowledge proof based on the master backup public key and the encrypted shares that determines whether the encrypted shares were encrypted using the master backup public key without revealing the other system's shares. Thus, in an embodiment, a system can validate that the encryption of the shares was performed correctly without using the master backup private key or causing shares to be revealed.

In an embodiment, keys can be split between the service provider and more than one customer via distribution of shares. This may allow two trading customers to utilize the service provider's service to exchange different types of tokens using the service by transferring shares to their corresponding private key. For example, if customer A wants to trade n Bitcoins with customer B in exchange for customer B's m Ethereum tokens, the following protocol can be performed: The device of customer A will first generate a new bitcoin wallet w_A and the device of customer B will generate a new Ethereum wallet w_B. Customer A will transfer the funds to w_A and customer B will transfer the funds to w_B. Once customers A and B confirm that the funds are in w_B and w_A respectively, A can add a new user share to w_A and send to customer B; and customer B can add a new user share to w_B and send to customer A. The trade may be executed immediately by having the service provider delete its corresponding shares that were previously owned by customer A in w_A and the shares that were previously owned by customer B in w_B. Then, customer B owns w_A and customer A owns w_B because they have a critical mass of the cryptographic material.

The disclosed embodiments reduce the complexity as compared to utilizing multiple keys while being more secure than use of a single key. In particular, theft of a single share or the compromising of only one system storing shares will not lead to unauthorized signing or transfer of funds or exposure of private keys. Further, the disclosed embodiments provide a protocol-agnostic (and, therefore, cryptocurrency-agnostic, for cryptocurrency applications) solution with simpler transactions as compared to multi-signature solutions. Also, as compared to cold wallets, the disclosed embodiments provide a faster and more flexible solution that may be delivered as a software only cloud service, thereby allowing for efficient scaling and auditing. The service may be provided with minimal interference with user networks and systems.

In addition to the aforementioned advantages, shares may be rotated among entities to prevent collecting keys via the shares. The rotation may include generating new shares that correspond to the same private key as previous shares formed. The new shares may be derived from the previous shares. Shares may be rotated periodically, for example every hour or day. The shares may be stored on separate networks, thereby drastically decreasing the likelihood of simultaneously infiltrating the networks to retrieve all shares. Shares may be rotated without needing to change the latent private key. Additionally, keys may be split using arbitrarily complex schemes to increase security.

Additionally, in some embodiments, the signing policy may define additional requirements for signing data. The additional requirements may differ, for example, depending on an amount of a transaction (i.e., higher value transactions require more stringent requirements), a destination of the transaction (e.g., a recipient such as a recipient of currency in a cryptocurrency transaction), a type of the transaction (e.g., exchange of currency as opposed to goods or services, exchanges of particular types of goods or services, completion of smart contract terms), a transaction history of a user participating in the transaction (e.g., users with a history of previous suspicious transactions may require additional authorizations), time of day (e.g., a time of day at which the signing occurs), and the like. Such requirements may require approval by other entities (e.g., managers, upper management, financial advisers, etc.), particular authentication methods (e.g., password, biometric authentication, multi-factor authentication, device certificate, one-time password, etc.), both, and the like. Further, other criteria may be utilized for determining whether additional requirements are to be used for other types of data to be signed (e.g., messages not representing blockchain transactions).

The additional requirements provide an adaptive policy engine that increases security of transactions and minimizes harm caused by malicious entities. For example, an attacker that gains access to an employee's device may be unable to make higher value transactions because the attacker cannot gain approval from a manager or financial adviser. The signing policy may also ensure authenticity of the request using multi-factor authentication, for example by sending an email to the requesting user to validate the request.

As a non-limiting example for securing keys used for signing Bitcoin transaction data, a signing policy defines that transactions under $100,000 (e.g., transfer of less than $100,000 of assets) only require employee approval; that transactions of $100,000 to $1 million require additional approval by a manager; that transactions over $1 million require approval of an employee, a manager, and a finance auditor using biometric authentication from a corporate IP address; and that transactions over $50 million require approval of an employee, a manager, and finance analyst, the CFO, and the CISO via biometric authentication from mobile device as well as a password from a corporate laptop.

Continuing the above example, an employee authenticates to a portal for requesting access to funds secured by and recorded on a blockchain as Bitcoin transactions. The employee requests $110,000 worth of Bitcoin to be deposited in a wallet W. Wallet W is not recognized as a known preapproved wallet and, thus, the signing policy requires approval from the employee, a manager, and a finance analyst via biometric authentication from their respective mobile devices. The manager and the finance analyst each receives a text notification asking for approval of the transaction sending $110,000 of Bitcoin to Wallet W and logs in to the portal to perform the biometric authentication. Once all other required approvals have been received, the employee is notified via an application or email. The employee logs in to the portal (if logged out) and authenticates. The transaction proceeds. The signing policy is enforced by the service provider as a prerequisite to its participation in the MPC protocol.

Figure 2:
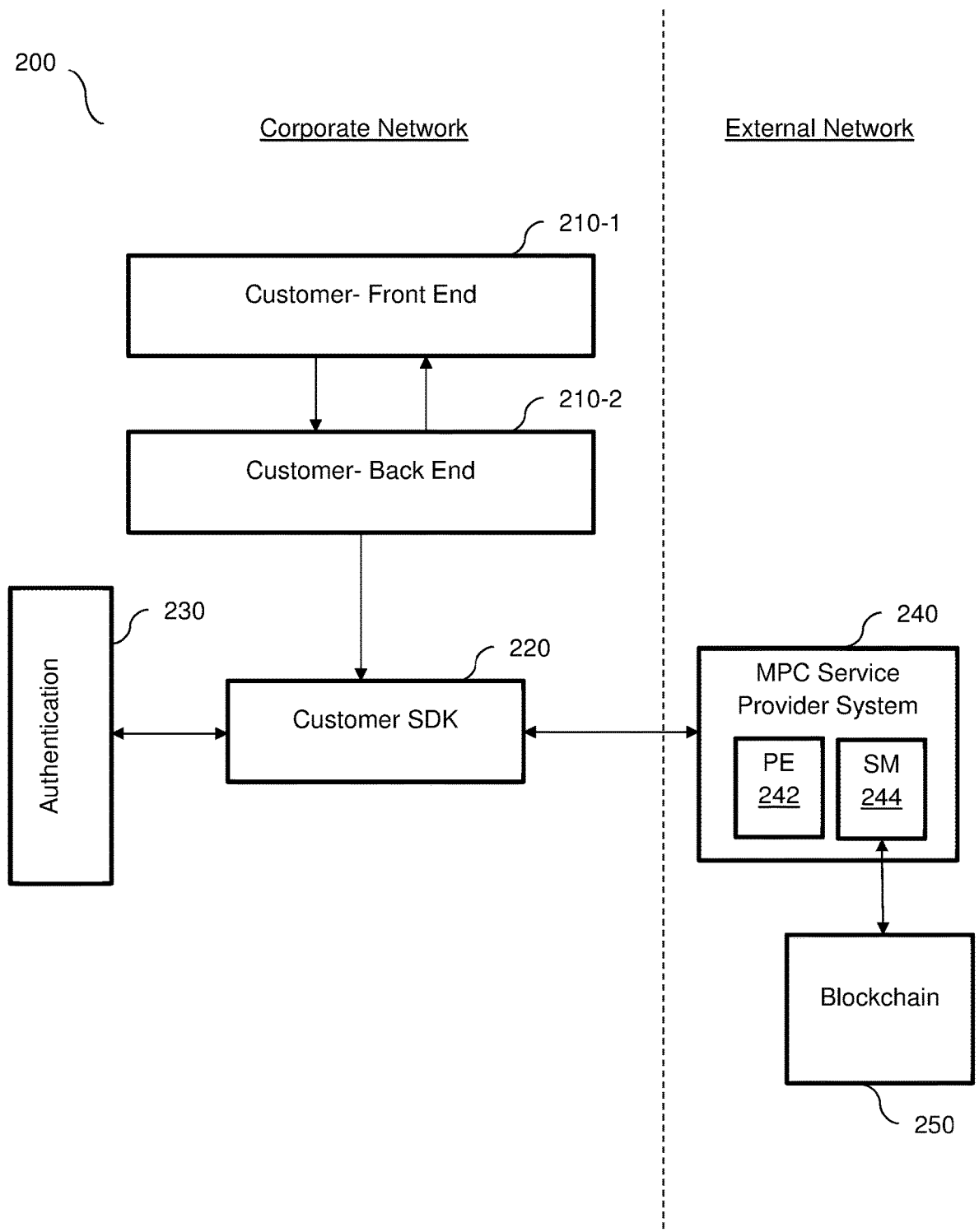
FIG. 2 is a block diagram utilized to describe an example implementation for securing digital signature via multi-party computation.

FIG. 2 shows an example block diagram 200 utilized to describe an example implementation for securing a blockchain via key splitting. In the example block diagram 200, a frontend 210-1 and a backend 210-2 of a customer's system are used to perform an exchange with respect to a blockchain-related transaction such as, but not limited to, a transfer of a Bitcoin. A customer-side Software Development Kit (customer SDK) 220 creates and stores a first share to be used for signing transactions by a user. The customer SDK 220 may be included in, for example, a user device of the user (e.g., a mobile device or personal computer), a server on the corporate network, and the like. An authentication 230 is performed to verify that the transferring user is authorized. The exchange, access, and authentication occur over a corporate network (not shown).

Once the user is authenticated, the customer SDK 220 communicates with a MPC service provider system 240 over an external network (not shown). The customer SDK 220 is run and controlled by the customer and is not controlled by the service provider. To this end, an interactive protocol is run between the customer SDK 220 and the MPC service provider system 240. The communication includes the various cryptographic protocols described herein. The external network may be or may include, but is not limited to, the Internet. In an example implementation, the MPC service provider system 240 may be deployed in a cloud computing platform (not shown) accessible over the external network. During this process, neither the shares nor the latent private key is exposed over the external network. Additionally, an insider having access to the corporate network can at best access shares stored on systems in the corporate network but not those stored on systems in the external network and, specifically, on the MPC service provider system 240.

In an embodiment, the MPC service provider system 240 is configured with a policy engine (PE) 242 and a share manager (SM) 244. The policy engine 242 is configured to determine whether a signing policy is met at least based on shares stored by the counterpart backend 220 and the MPC service provider system 240. The policy engine 242 may further be configured to determine whether the signing policy is met based on one or more additional requirements. The additional requirements may indicate other entities (not shown) that must approve a transaction, required authentication protocols (e.g., multi-factor authentication, use of particular devices, biometric authentication, combinations thereof, etc.), both, and the like.

The share manager 244 is configured to create shares. When the policy engine 242 determines that a transaction is to be signed, it notifies the share manager 244 to participate in the MPC. The MPC may fail if the other parties fail to deliver their shares. When sufficient shares are present, the MPC service provider system 240 signs the transaction data via the MPC interactive protocol.

The MPC service provider system 240 may be, but is not limited to, a server or other system configured to perform various disclosed embodiments. Each of the customer SDK 220 and the MPC service provider system 240 may include, but is not limited to, a processing circuitry and a memory, the memory containing instructions that, when executed by the processing circuitry, configures the respective counterpart to perform a portion of the functions described herein. The MPC provider system 240 may be deployed in, for example, a cloud computing environment (not shown). An example block diagram of the MPC service provider system 240 is described further herein below with respect to FIG. 4.

It should be noted that FIG. 2 shows a single customer side SDK 220 and a single MPC service provider system 240 merely for simplicity purposes and without limiting the disclosed embodiments. Multiple customer side SDKs 220, MPC service provider systems 240, or both, may be utilized, each storing one or more shares. Utilizing multiple MPC service provider systems, for example such that each holds a different share that is required in every signature, allows for reducing the risk of one rogue MPC service provider system from unilaterally signing data. To this end, in an embodiment using multiple MPC service provider systems, a consensus algorithm is utilized to agree on the policy in a way that would prevent a single point of failure. Further, FIG. 2 depicts a specific implementation of the share distribution described herein applied to secure shares used for signing transactions in a blockchain, but the disclosed embodiments are not limited to blockchain implementations. The disclosed embodiments may be used to secure any digital signatures consistent with the disclosure.

Figure 3:
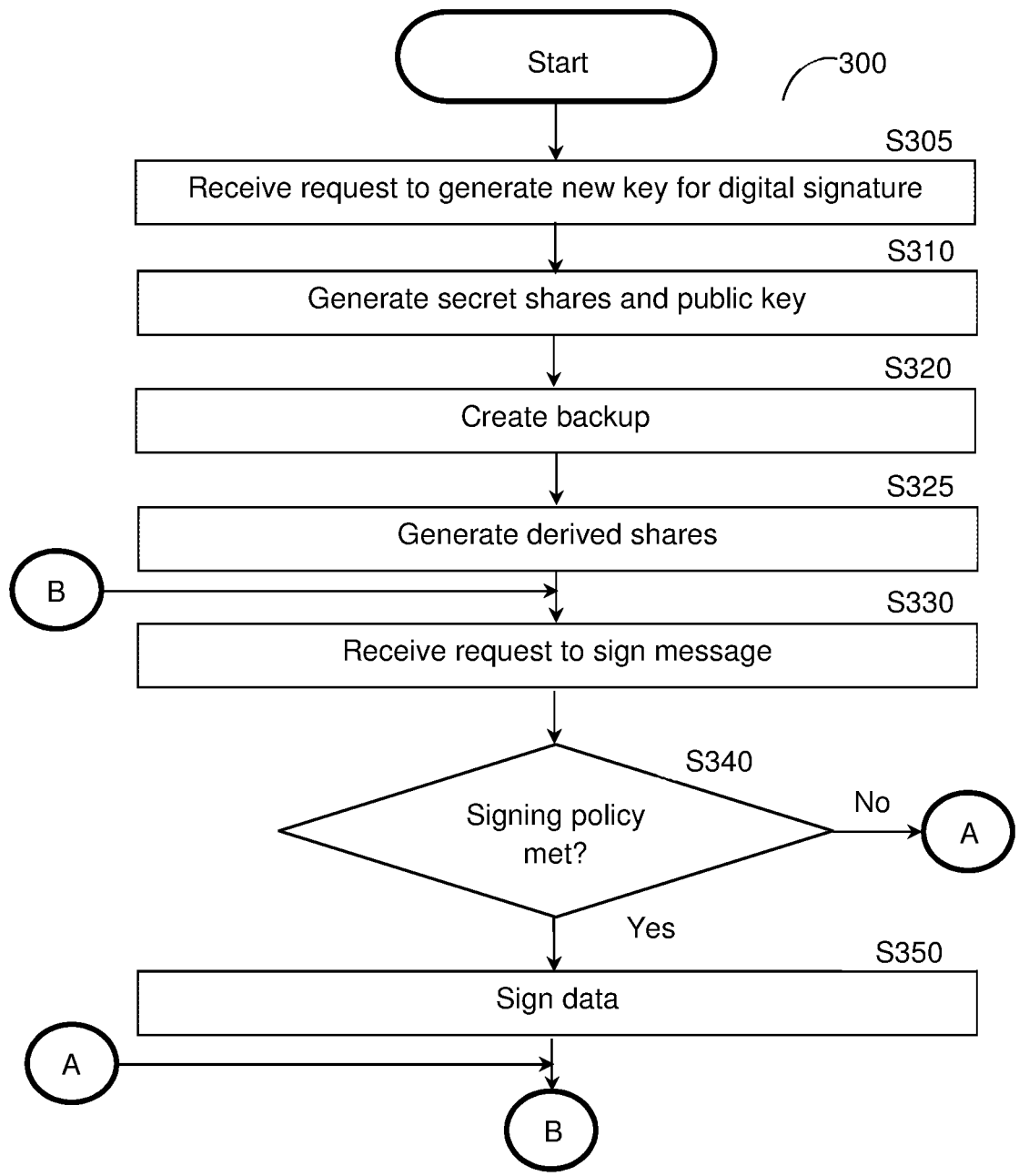
FIG. 3 is a flowchart illustrating a method for securing digital signatures via multi-party computation according to an embodiment.

FIG. 3 is an example flowchart 300 illustrating a method for securing digital signatures via MPC according to an embodiment. In an example implementation, the method may be performed by the MPC service provider system 240, the customer SDK 220, or both, FIG. 2.

At S305, a request for a new key for a digital signature is received. The request may be received from, for example, a user device (e.g., the customer SDK 220, FIG. 2).

At S310, secret shares and a public key are generated. The secret shares are created such that, when data is signed using each of the shares, at least k shares out of a total number n of shares is needed to successfully sign the data, where k and n are both integers having a value greater than or equal to 2 and k is less than or equal to n.

It should be noted that each party (i.e., each system) generates one or more secret shares and that none of the parties knows the full private key. As a non-limiting example, if a customer SDK (e.g., the customer SDK 220) and a MPC service provider system (e.g., the MPC service provider system 240) will store the shares, at least two shares are created. As another non-limiting example, if four systems will store the shares, at least four shares are created.

The system of each party creates one or more of the shares separately and independently from the other systems. As a non-limiting example, when the method of FIG. 3 is performed by the MPC service provider system 240, FIG. 2, the customer SDK 220 separately generates one or more shares.

In another embodiment, S310 may include secure distributed generation of the same latent private key multiple times such that two or more sets of shares are created, with each set of shares including two or more shares. Each set of shares may be used to sign and validate the data such that all or a threshold number of shares of one of the sets are needed to sign the data. The scheme supports defining a threshold k in which k shares are needed out of the total number n of shares, where k is less than or equal to n. As a non-limiting example, 5 shares are created among a customer and a service provider, with 2 to be generated by the customer and 3 by the service provider. Any 4 of the 5 shares may be needed for access. As another non-limiting example, the private key may be generated by 3 parties creating shares, for example a customer, a service provider, and a trusted third party.

The public key is generated (for example, by one of the systems) based on the secret shares such that data signed using the secret shares corresponds to the public key. Due to this correspondence, the secrets shares have the property that the secret shares could be validated using the public key if the secret shares were to be assembled by a single system (which is not possible in accordance with the disclosed embodiments since the shares are not revealed among systems).

At optional S320, an encrypted backup for the secret shares is created and provided to all parties. No portion of any secret share is revealed in the process. In an embodiment, S330 includes checking whether the secret shares correspond to the master backup public key using a zero-knowledge proof. All parties check using zero-knowledge proofs that the appropriate data is encrypted without requiring any party to know how to decrypt the encrypted backup. Thus, the encrypted backup is guaranteed to provide a backup to the owner of the matching decryption key.

In an embodiment, S320 includes creating master backup public and private keys by one system and providing the master backup public key to all other systems. Once the master backup public key has been distributed, any of the systems can validate that shares were encrypted by another system using the encrypted shares and the master backup public key. To this end, each system is configured to perform a zero-knowledge proof that confirms whether the encrypted shares were encrypted by one of the systems using the master backup public key. No portion of the shares of any system are revealed to the other systems at any time during the validation. The validation may be performed, for example, when signing is to occur (e.g., the signing discussed with respect to S350).

Existing solutions utilize a threshold Paillier encryption that requires a very long setup. The threshold encryption scheme utilized according to various disclosed embodiments may efficiently be built from Paillier. To this end, in an embodiment, the two or more systems participate in the following interactive protocol: each system generates a key pair for Paillier. The public key of a party "i" is denoted by public key pk_i. An encryption of a message "m" is done by creating "n" secret shares (where "n" is an integer having a value greater than or equal to 2) using a linear t-out-of-n secret sharing scheme, and encrypting the i-the share with public key pk_i. In an example implementation, the Damgård, Jurik, and Nielsen variant of the Paillier scheme may be used.

In an embodiment, once the shares are encrypted, a set of one or more entities can decrypt their secret shares and reconstruct the message. In addition, the resulting encryption (i.e., a vector of encryptions) is secure and additively homomorphic. To this end, in an embodiment, a zero knowledge protocol is used assuming that, for encryption of data c, $g\hat{\ }a$, and $g\hat{\ }b$, Enc(c') is equal to Enc(a*c+b), where "g" is a generator in a finite group in which the decisional Diffie-Hellman (DDH) assumption is hard, Enc( ) is any additive homomorphic encryption, and "a" and "b" are secret values known only to the prover. Notably, the group generated by g and the group of the plaintext of the Paillier encryptions are of different sizes. The resulting proof is zero knowledge even against a verifier who knows how to decrypt c'.

At optional S325, key derivation is performed. The derivation results in a derived public key that is a predetermined function of the original public key (e.g., the public key generated at S310). The derived key may be used at S330 as keys generated at S310. The key derivation may be performed according to, for example, the BIP32 standard. As a non-limiting example, if the shares generated at S310 were corresponding to an original public key p, the output of the share derivation would be new shares s1' and s2' corresponding to a new public key p', where the relation between p and p' is as defined by BIP32.

Existing solutions use additive sharing or multiplicative sharing of the private key. In an embodiment, parties can use multiplicative sharing and still derive new keys following the BIP32 standard, thereby supporting key derivation following BIP32. This is achieved by transforming the multiplicative secret shares to additive secret shares, adding the additive part of the key derivation, and transforming it back to new multiplicative secret shares.

At S330, a request for a signature on a message is received. The request may be received from, for example, a user device (e.g., the customer SDK 220, FIG. 2). The request at least includes data to be signed (for example, Bitcoin transaction data).

At S340, it is determined whether requirements of a signing policy have been met and, if so, execution continues with S350; otherwise, execution either terminates (not shown) or continues with S330 (shown). The signing policy includes rules for validating the authenticity and, if the transaction is approved, the system of the validating party (for example, the service provider) will use its respective shares in order to sign a transaction. The signing policy may further include additional requirements as described herein above. To this end, S340 may include communicating with other systems to, for example, prompt other users to provide authentication and approval for the transaction.

At S350, the shares are used to sign the data. The signing includes running a MPC protocol the shares as part of an interactive signing process. The interactive signing process includes each system running a MPC protocol using its respective shares. In an embodiment, the data is signed using a distributed implementation of a digital signature algorithm (for example ECDSA/EdDSA/ED25519), such that the full private key is never reconstructed on any system. In a further embodiment, during the signing, no portion of each system's shares is revealed to the other system. As non-limiting examples, such a digital signature algorithm may be ECDSA, Edwards-curve Digital Signature Algorithm (EdDSA), Ed25519, and the like. The security of the protocol may be proven based on cryptographic assumptions (e.g., a discrete log). To this end, the digital signature algorithm may utilize an additive homomorphic encryption scheme and efficient zero knowledge proofs for proving statements about elements from different finite groups without conveying other information about the elements.

In another embodiment, S350 further includes performing a key derivation as part of the signature step without deriving the actual keys separately. In that case, the parties may sign a message with shares of a derived key directly using the shares of the original key.

In an optional embodiment, one or more of the systems, one or more of the shares used for the signing, or both, may be offline at least with respect to the other systems (i.e., not connected to a network or, more specifically, not connected at least to the network used by the other systems) so that only one interaction will be required during the signing. It should be noted that a share may be stored offline even if the system storing the share is online. For example, a share may be stored locally on the system such that the location in which the share is stored is not accessible over a network.

The optional offline embodiment allows for minimizing interactions by the offline systems, minimizing exposure of the offline shares, or both. In a further embodiment, one of the systems is offline except during a small number of rounds of interaction (e.g., below a predetermined threshold). In those rounds of interaction, the offline system receives aggregated messages from the other systems. Each aggregated message includes information used for the distributed implementation of the digital signature algorithm provided by all of the online systems. The result of the interactive rounds may be used for multiple signing operations, each requiring only a single round of interaction.

It should be noted that, in an embodiment, no portion of any of the shares is revealed to any system outside of the system that generated those shares at any time. In other words, each system maintains its own shares, and shares are not provided or otherwise revealed to the other participating systems or other external systems. Since shares are not revealed to other systems, the latent private key cannot be reconstructed and used to fraudulently sign transactions.

It should be noted that steps S330 through S350 may be repeated with the same keys generated in S310 because the same keys can be used for signing multiple messages.

It should also be noted that, in an embodiment, shares generated at S310 may be rotated in a way that is consistent with the public key of the digital signature. Such rotation may be performed between any two or more parties that wish to refresh their secret shares. The parties may proceed to S330 as if the shares were generated in S310. The rotation includes creating new shares that collectively form the same private key as the previous shares and may include, but is not limited to, generating derived shares as discussed with respect to S325 or repeating S310 to independently generate new shares.

It has been identified that existing solutions support distributed key generation and signature without providing a verifiable encrypted backup. To this end, the disclosed embodiments may also be utilized to provide such a verified encrypted backup. In an embodiment, each party encrypts its secret share using a public key encryption scheme (e.g., RSA) and proves with a zero-knowledge proof that it encrypted the right value. As a non-limiting example, the parties may use additive shares to generate the signature keys as following: party i chooses a number xi and publishes xiG, where G is a generator in the elliptic curve used for the digital signature. Note that x is hidden given xG based on the security of the digital signature in use. The public key of the digital signature will be x1G+x2G+ . . . =(x1+x2+ . . . )G. In addition, party i encrypts xi under the public key of the backup encryption and proves with a zero-knowledge proof that the same xi is used in xiG and the encrypted backup.

Figure 4:
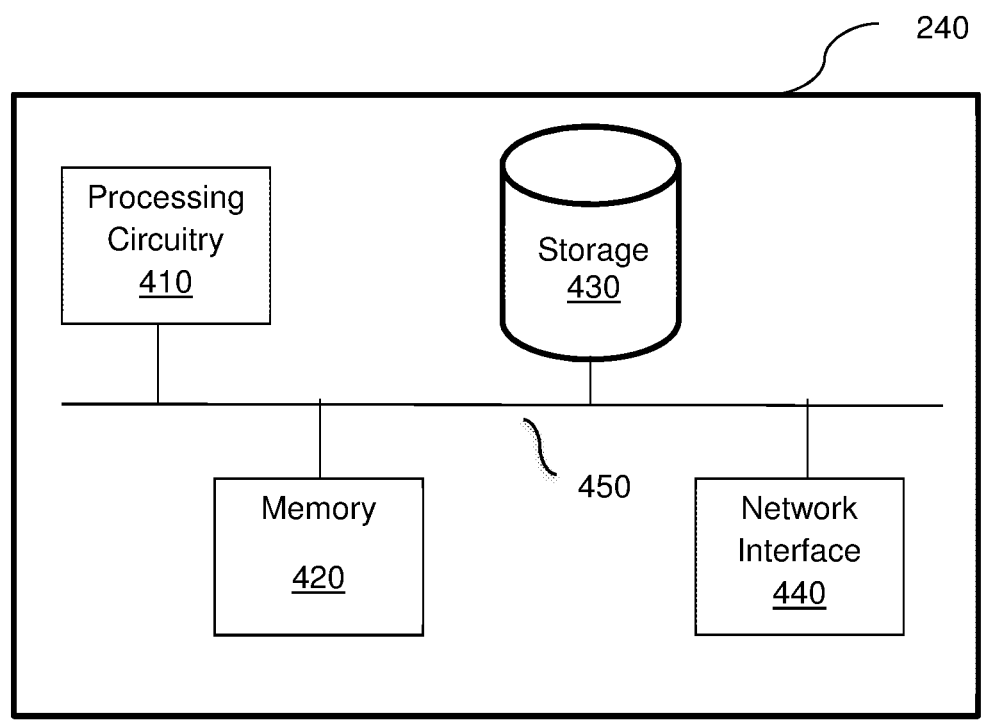
FIG. 4 is a block diagram of a software as a service system according to an embodiment.

FIG. 4 is an example schematic diagram of the MPC service provider system 240 according to an embodiment. The MPC service provider system 240 includes a processing circuitry 410 coupled to a memory 420, a storage 430, and a network interface 440. The components of the MPC service provider system 240 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), encrypted verifiable hardware, secure elements, secure verifiable enclaves within microprocessors such as Intel© SGX, and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, configure the processing circuitry 410 to perform at least some of the various processes described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the MPC service provider system 240 to communicate with, for example, systems storing a blockchain (e.g., the blockchain 250, FIG. 2), the counterpart backend 220, and the like, for purposes such as, but not limited to, receiving shares of private keys, sending signed transaction data for recording, and the like.

It should be understood that the embodiments described herein are not limited to the specific architecture illustrated in FIG. 4, and other architectures may be equally used without departing from the scope of the disclosed embodiments. Additionally, other systems configured to create shares based on private keys and to sign transactions using the shares may be similarly configured to the MPC service provider system 240 shown in FIG. 4.

It should be noted that various embodiments described herein are discussed with respect to securing blockchain or cryptocurrency transactions merely for example purposes and without limitation on the disclosed embodiments. Any transactions recorded on blockchains (e.g., transfers of property, completion of services designated in smart contracts, etc.) may be secured according to the disclosed embodiments by signing the respective transaction data with shares corresponding to private keys as described herein. Moreover, the embodiments described can be used to secure any digital signature mechanism, not necessarily related to blockchain, such as certificate authorities, document signing, and the like. To this end, any messages, whether used to represent blockchain transactions or otherwise, may be signed according to the disclosed techniques.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for securing digital signatures using multi-party computation, comprising:
   receiving a request to digitally sign a blockchain message;
   generating, by a first system, at least one first secret share out of a plurality of secret shares associated with a private key, wherein the plurality of secret shares are generated by a plurality of systems for digitally signing and authorizing the blockchain message;
   determining a signing policy for a blockchain protocol corresponding to the blockchain message;
   determining, from a total number of secret shares, a minimum number of secret shares of the plurality of secret shares required for authenticating the blockchain message based on the signing policy, wherein the minimum number of secret shares designates a number of secret shares generated between the plurality of systems based on the signing policy;
   requesting at least one second secret share to be generated by at least one second system separate from the first system, wherein the plurality of secret shares includes the at least one first secret share generated by the first system and the at least one second secret share generated by at the least one second system, and wherein the at least one first secret share and the at least one second secret share are not exchanged between the first system and the at least one second system;
   receiving an encrypted backup of the at least one second secret share from the at least one second system, wherein the encrypted backup prevents revealing any portions of the at least one second secret share;
   determining a master backup public key provided to the first system and the at least one second system;
   validating the at least one second secret share was generated by the at least one second system using encrypted backup and the master backup public key without revealing any portion of the at least one second secret key to the first system;
   signing data based on the private key when the signing policy is met and the at least one second secret share is validated, wherein the signing occurs as part of an interactive signing process, wherein the interactive signing process includes running a multi-party computation protocol by the first system and the at least one second system, wherein each system uses each secret share of the plurality of secret shares during the interactive signing process, wherein the private key corresponds to a public key, wherein the public key is generated based on the plurality of secret shares, wherein the signing policy at least requires the minimum number of secret shares of the plurality of secret shares, and wherein the signing policy requires the at least one first secret share and the at least one second secret share to meet the signing policy; and
   rotating the plurality of secret shares between at least the first system and the at least one second system periodically after the signing the data, wherein at least one third secret share of a second set of secret shares is generated by the first system during the rotating, wherein the second set of secret shares corresponds to the public key, wherein the second set of shares includes the at least one third secret share and at least one fourth secret share generated by the at least one second system during the rotating.

2. The method of claim 1, further comprising:
   generating, by the first system, the master backup public key and a master backup private key, wherein an encrypting second system of the at least one second system encrypts the at least one second secret share using the master backup public key, wherein the validating comprises determining that the at least one encrypted share was encrypted using the master backup public key, wherein no portion of the at least one first secret share is revealed to the at least one second system during the validating, and wherein no portion of the at least one second secret share is revealed to the first system during the validating.

3. The method of claim 1, wherein the public key is a first public key, and wherein the method further comprises:
generating a second public key based on the plurality of shares, wherein the second public key is a predetermined function of the first public key.

4. The method of claim 1, wherein the signing policy further requires at least one additional requirement.

5. The method of claim 4, wherein the at least one additional requirement includes at least one of: an approval by at least one entity or at least one authentication.

6. The method of claim 4, wherein the data to be signed is transaction data for a blockchain transaction using the blockchain protocol, and wherein the at least one additional requirement is determined based on at least one of: an amount of the transaction, a destination of the transaction, a type of the transaction, a transaction history of a user participating in the transaction, or a time of day.

7. The method of claim 1, further comprising:
determining, by the first system, whether the signing policy is met based on the at least one first secret share and the at least one second secret share.

8. The method of claim 1, wherein the minimum number of shares required by the signing policy for signing using the first set of shares is a first minimum number of shares, and wherein the minimum number of shares required by the signing policy for signing using the second set of shares is a second minimum number of shares.

9. The method of claim 1, wherein the at least one third secret share is generated based on the at least one first secret share, and wherein the at least one fourth secret share is generated based on the at least one second secret share.

10. The method of claim 1, wherein the interactive signing process includes a plurality of rounds, wherein the plurality of rounds consists of at least one first round and a second round, and wherein the at least one of the plurality of shares is stored offline during the at least one first round of the interactive signing process.

11. The method of claim 1, wherein at least one of the first system or the at least one second system is offline during at least one round of the interactive signing process.

12. The method of claim 1, wherein at least one of the plurality of shares is offline during at least one round of the interactive signing process.

13. The method of claim 1, wherein no portion of the at least one first secret share is revealed outside of the first system, and wherein no portion of the at least one second secret share is revealed outside of the at least one second system.

14. A non-transitory computer readable medium having stored thereon instructions for causing a processing circuitry to execute a process, the process comprising:
receiving a request to digitally sign a blockchain message;
generating, by a first system, at least one first secret share out of a plurality of secret shares associated with a private key, wherein the plurality of secret shares are generated by a plurality of systems for digitally signing and authorizing the blockchain message;
determining a signing policy for a blockchain protocol corresponding to the blockchain message;
determining, from a total number of secret shares, a minimum number of secret shares of the plurality of secret shares required for authenticating the blockchain message based on the signing policy, wherein the minimum number of secret shares designates a number of secret shares generated between the plurality of systems based on the signing policy;
requesting at least one second secret share to be generated by at least one second system separate from the first system, wherein the plurality of secret shares includes the at least one first secret share generated by the first system and the at least one second secret share generated by the at least one second system, and wherein the at least one first secret share and the at least one second secret share are not exchanged between the first system and the at least one second system;
receiving an encrypted backup of the at least one second secret share from the at least one second system, wherein the encrypted backup prevents revealing any portions of the at least one second secret share;
determining a master backup public key provided to the first system and the at least one second system;
validating the at least one second secret share was generated by the at least one second system using encrypted backup and the master backup public key without revealing any portion of the at least one second secret key to the first system;
signing data based on the private key when the signing policy is met and the at least one second secret share is validated, wherein the signing occurs as part of an interactive signing process, wherein the interactive signing process includes running a multi-party computation protocol by the first system and the at least one second system, wherein each system uses each secret share of the plurality of secret shares during the interactive signing process, wherein the private key corresponds to a public key, wherein the public key is generated based on the plurality of secret shares, wherein the signing policy at least requires the minimum number of secret shares of the plurality of secret shares, and wherein the signing policy requires the at least one first secret share and the at least one second secret share to meet the signing policy; and
rotating the plurality of secret shares between at least the first system and the at least one second system periodically after the signing the data, wherein at least one third secret share of a second set of secret shares is generated by the first system during the rotating, wherein the second set of secret shares corresponds to the public key, wherein the second set of shares includes the at least one third secret share and at least one fourth secret share generated by the at least one second system during the rotating.

15. A system for securing digital signatures using multi-party computation, comprising:
processing circuitry; and
a memory, the memory containing instructions that, when executed by the processing circuitry, enable the system to:
receive a request to digitally sign a blockchain message;
generate, with a first system, at least one first secret share out of a plurality of secret shares associated with a private key, wherein the plurality of secret shares are generated by a plurality of systems for digitally signing and authorizing the blockchain message;

determine a signing policy for a blockchain protocol corresponding to the blockchain message;

determine, from a total number of secret shares, a minimum number of secret shares of the plurality of secret shares required for authenticating the blockchain message based on the signing policy, wherein the minimum number of secret shares designates a number of secret shares individually generated by each of the plurality of systems based on the signing policy;

request at least one second secret share to be generated by at least one second system separate from the first system, wherein the plurality of secret shares includes the at least one first secret share generated by the first system and the at least one second secret share generated by the at least one second system, and wherein the at least one first secret share and the at least one second secret share are not exchanged between the first system and the at least one second system;

receive an encrypted backup of the at least one second secret share from the at least one second system, wherein the encrypted backup prevents revealing any portions of the at least one second secret share;

determine a master backup public key provided to the first system and the at least one second system;

validate the at least one second secret share was generated by the at least one second system using encrypted backup and the master backup public key without revealing any portion of the at least one second secret key to the first system;

sign data based on the private key when the signing policy is met and the at least one second secret share is validated, wherein the signing occurs as part of an interactive signing process, wherein the interactive signing process includes running a multi-party computation protocol by the first system and the at least one second system, wherein each system uses each secret share of the plurality of secret shares during the interactive signing process, wherein the private key corresponds to a public key, wherein the public key is generated based on the plurality of secret shares, wherein the signing policy at least requires the minimum number of secret shares of the plurality of secret shares, and wherein the signing policy requires the at least one first secret share and the at least one second secret share to meet the signing policy; and rotate the plurality of secret shares between at least the first system and the at least one second system periodically after the signing the data, wherein at least one third secret share of a second set of secret shares is generated by the first system during a rotation of the plurality of secret shares between at least the first system and the at least one second system, wherein the second set of secret shares corresponds to the public key, wherein the second set of shares includes the at least one third secret share and at least one fourth secret share generated by the at least one second system during the rotation.

16. The system of claim 15, wherein executing the instructions further enables the system to:
generate the master backup public key and a master backup private key, wherein an encrypting second system of the at least one second system encrypts the at least one second secret share using the master backup public key,
wherein validating the at least one second secret share comprises determining that the at least one encrypted share was encrypted by the encrypting second system using the master backup public key, wherein no portion of the at least one first secret share is revealed to the at least one second system during the validation, and wherein no portion of the at least one second secret share is revealed to the first system during the validation.

17. The system of claim 15, wherein the public key is a first public key, wherein executing the instructions further enables the system to:
generate a second public key based on the plurality of shares, wherein the second public key is a predetermined function of the first public key.

18. The system of claim 15, wherein the signing policy further requires at least one additional requirement.

19. The system of claim 18, wherein the at least one additional requirement includes at least one of: an approval by at least one entity or at least one authentication.

20. The system of claim 18, wherein the data to be signed is transaction data for a blockchain transaction using the blockchain protocol, and wherein the at least one additional requirement is determined based on at least one of: an amount of the transaction, a destination of the transaction, a type of the transaction, a transaction history of a user participating in the transaction, or a time of day.

21. The system of claim 15, wherein executing the instructions further enables the system to:
determine whether the signing policy is met based on the at least one first secret share and the at least one second secret share.

22. The system of claim 15, wherein the minimum number of shares required by the signing policy for signing using the first set of shares is a first minimum number of shares, and wherein the minimum number of shares required by the signing policy for signing using the second set of shares is a second minimum number of shares.

23. The system of claim 15, wherein the at least one third secret share is generated based on the at least one first secret share, and wherein the at least one fourth secret share is generated based on the at least one second secret share.

24. The system of claim 15, wherein the interactive signing process includes a plurality of rounds, wherein the plurality of rounds consists of at least one first round and a second round, and wherein the at least one of the plurality of shares is stored offline during the at least one first round of the interactive signing process.

25. The system of claim 15, wherein at least one of the first system or the at least one second system is offline during at least one round of the interactive signing process.

26. The system of claim 15, wherein at least one of the plurality of shares is offline during at least one round of the interactive signing process.

27. The system of claim 15, wherein no portion of the at least one first secret share is revealed outside of the first system, and wherein no portion of the at least one second secret share is revealed outside of the at least one second system.

* * * * *